United States Patent [19]

Krafft et al.

[11] Patent Number: 5,043,541

[45] Date of Patent: Aug. 27, 1991

[54] BRANCH CIRCUIT FOR INSERTABLE SWITCH

[75] Inventors: Henning Krafft; Klaus Grahlmann, both of Neumünster; Jorn Grimm, Böhnhusen, all of Fed. Rep. of Germany

[73] Assignee: Licentia Patent-Verwaltungs-GmbH, Frankfurt, Fed. Rep. of Germany

[21] Appl. No.: 419,582

[22] Filed: Oct. 10, 1989

[30] Foreign Application Priority Data

Oct. 10, 1988 [DE] Fed. Rep. of Germany ....... 3834363
Oct. 13, 1988 [DE] Fed. Rep. of Germany ....... 3834820

[51] Int. Cl.$^5$ ..................... H01H 9/00; H02B 11/00
[52] U.S. Cl. ............................ 200/50 AA; 361/336
[58] Field of Search .................. 200/50 AA, 307, 573; 361/336, 335, 338, 341, 342, 337

[56] References Cited

U.S. PATENT DOCUMENTS 3,188,415 6/1965 Netzel ............................ 200/50 AA
4,477,701 10/1984 Castonguay et al. ......... 200/50 AA
4,531,174 7/1985 Rickmann ................... 200/50 AA X
4,761,521 8/1988 Beck et al. ..................... 200/50 AA Primary Examiner—J. R. Scott
Attorney, Agent, or Firm—Spencer & Frank

[57] ABSTRACT

A branch circuit connection and a fastening mechanism for auxiliary switches for insertable switches used with movable main contact carriers. The branch circuit connection is composed of a female connector strip disposed at the side wall of the enclosure for the insertable switch and movable main contact carrier. A corresponding male connector strip is rigidly fastened to an insertable switch and a lever mechanism coupled to the main contact carrier is provided for lowering, raising or causing the female connector strip to dwell in dependence of the OFF-TEST-ON operating condition of the insertable switch. The auxiliary switches are received in a housing which is fastened to a wall of the enclosure and are controlled by way of a slide which is articulated to the movable main contact carrier.

12 Claims, 2 Drawing Sheets

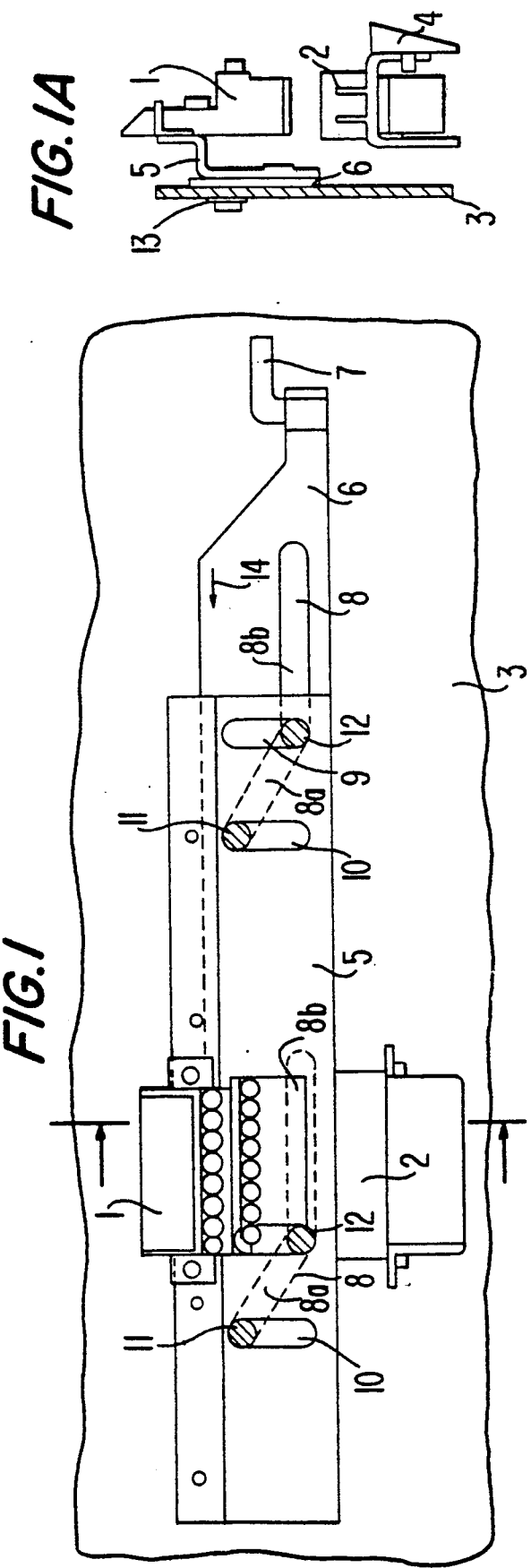

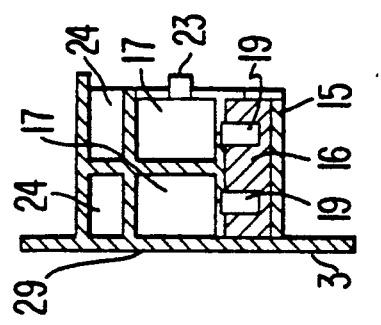
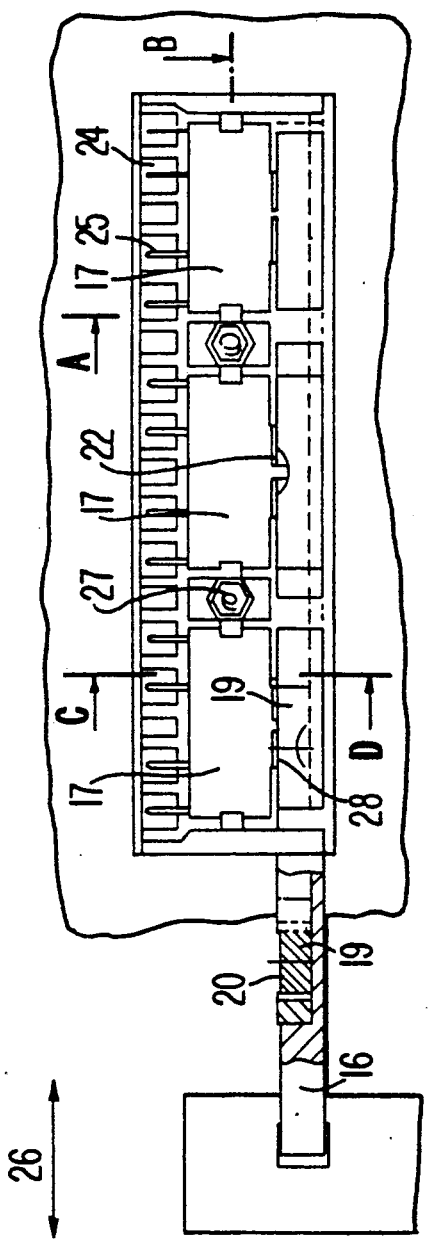

5,043,541

BRANCH CIRCUIT FOR INSERTABLE SWITCH

CROSS REFERENCE TO RELATED APPLICATION

This application claims the priority of application Ser. No. P 38 34 363.0, filed Oct. 10, 1988, and application Ser. No. P 38 34 820.9, filed Oct. 13, 1988, both in the Federal Republic of Germany, the subject matter of which Applications is incorporated herein by reference.

BACKGROUND OF THE INVENTION

The present invention relates to branch circuits for switch components, such as switchbeakers, which are insertable in an enclosure for connection/disconnection to main and load circuits. More particularly the invention relates to a branch circuit connection for a switch component which is insertable in an enclosure having a side wall, wherein the branch circuit connection is articulated to a main contact carrier which is movable within the enclosure for establishing main circuit connections between the switch component and bus bars of a switching panel, and the switch component remains stationary during movement of the main contact carrier among OFF-TEST-ON operating positions of the main contact carrier relative to the switch component. The invention additionally relates to a fastening device for auxiliary switches of branch circuits of a switch component inserted in an enclosure having a side wall, the auxiliary switches being controlled in dependence on operating positions of a movable main contact carrier which is movable among OFF-TEST-ON positions relative to the insertable switch component which remains stationary in the enclosure.

U.S. Pat. No. 3,188,415 discloses a switchgear mechanism for an insertable switch component in which branch circuit contacts are fastened to a movable main contact carrier which is movable relative to the main contacts into ON-TEST-OFF operating positions. The branch circuit contacts are mounted on the movable main contact carrier and project beyond the main contacts on the movable main contact carrier. When the movable main contact carrier is placed in the ON operating position, the branch circuit contacts slide onto contact pins fastened to the insertable switch component before the main contacts are closed. The contact paths and contact pins of these prior art branch circuit connections are subject to contact reducing environmental influences and to mechanical damage.

In the past, the prior art branch circuit connections were made on the rear walls of the insertable switch components which required different types of attachments for insertable switch components of different widths.

SUMMARY OF THE INVENTION

It is an object of the present invention to provide a reliable branch circuit connection and an auxiliary switch fastening means for insertable switch components by means of movable main contact carriers which do not influence the installed height of the inserted components.

The above and other objects are accomplished according to the invention by the provision in a branch circuit connection of the type first described above wherein there is additionally included a female connector strip displaceably mounted at the side wall of the enclosure; a male connector strip for mating with the female connector strip and rigidly fastened to the insertable switch component; and a lever mechanism coupled to the main contact carrier for lowering, raising and causing the female connector strip to dwell in a position in dependence on the OFF-TEST-ON operating position of the main contact carrier.

The invention further provides for a fastening device of the type first described above wherein there is additionally included a housing for stationarily accommodating the auxiliary switches and being fastened to the side wall of the enclosure; and a slide articulated to the movable main contact carrier and controlling the auxiliary switches.

The present invention has the advantage that a reliable branch circuit connection is established by way of inexpensive and standardized male and female connector strips whose contacts are substantially protected against environmental influences. Another advantage is the lateral arrangement of the branch circuit connection which permits its use in insertable components of different widths. By way of a direct attachment of the slide of the auxiliary switch fastener to the movable main contact carrier, an operationally reliable coupling is produced between the control of the main circuit connections and the auxiliary switches.

Advantageous features are described below. Particular reference is made to the feature that the fastening means for the auxiliary switches permits the use of a large number of auxiliary switches, modified as described hereinbelow, in a space saving manner and which can be inserted into a housing by means of simple fastening means. Moreover, great variability of control functions is provided in view of the exchangeability of control inserts.

BRIEF DESCRIPTION OF THE DRAWINGS

Preferred embodiments of the invention will now be described in greater detail with reference to the drawing figures.

FIG. 1 is a schematic of a frontal view of a branch circuit connection according to the invention.

FIG. 1a is a sectional side view along the indicated section lines of FIG. 1.

FIG. 2 is a schematic of a side view of a fastening device for auxiliary switches according to another aspect of the invention.

FIG. 2a is a sectional top view along the section lines indicated in FIG. 2.

FIG. 2b is a sectional end view along the section lines indicated in FIG. 2.

DETAILED DESCRIPTION OF THE PREFERRED EMBODIMENTS

Referring to FIGS. 1 and 1a, there is shown a branch circuit connection including a carrier plate 5 for a female connector strip 1, a control plate 6, a connecting element 7 with which control plate 6 is articulated to a main contact carrier (not shown) which is movable within an enclosure having a side wall 3. The main contact carrier is used to establish in a known manner, as shown for example in the above mentioned U.S. Pat. No. 3,188,415, the main circuit connections between an insertable switch component 4, for example a circuit breaker, and bus bars of a switching panel. The branch circuit connection further includes control slots 8 in control plate 6, long hole guides 9 in carrier plate 5, long hole guides 10 in side wall 3 of the enclosure for the insertable device and the movable main contact carrier, pins 11 fastened to carrier plate 5 and pins 12 fastened to side wall 3.

Control plate 6 and carrier plate 5 are displaceably held at side wall 3 by way of pins 11 and 12, with carrier plate 5 being able to move only in the vertical direction and control plate 6 only in the horizontal direction. Control plate 6 is disposed between side wall 3 and carrier plate 5. Pins 11 fastened to carrier plate 5 penetrate an acute-angle slot section 8a of control slots 8 and long holes 10 in side wall 3. At their free ends, pins 11 are provided with lock washers 13 which rest on the exterior face of side wall 3 and thus hold control plate 6 and carrier plate 5 against the side wall. Pins 12, which are fastened to side wall 3, penetrate control slots 8 in their horizontal slot section 8b and long holes 9 in carrier plate 5. Pins 12, in conjunction with control slots 8 and long holes 9 in carrier plate 5, determine the vertical and horizontal motion coordinates of control plate 6 and carrier plate 5. By means of pins 11, the horizontal movement of control plate 6 is translated into a vertical movement of carrier plate 5. The inclination of the acute-angled slot section 8a of control slots 8 and the length of long holes 9 permits the path of female connector strip 1 to be dimensioned so that reliable closing and sufficient opening of the branch circuit connection is realized. The branch circuit connection must open to the extent that female connector strip 1 can be moved completely out of engagement with male connector strip 2. Female connector strip 1 is adjustably fastened on carrier plate 5 so that, after adjustment, female connector strip 1 and male connector strip 2 are able to easily slide into one another. The sloped angle section 8a and the horizontal slot section 8b of control slots 8 are matched with one another in such a way that the branch circuit connection is closed in the closing and opening phases between operating positions of the movable main contact carrier which place the insertable switch component in the OFF and TEST mode and between operational positions of the movable main contact carrier which place the insertable switch component in the TEST-ON-TEST modes.

The pins of the carrier plate slide in the horizontal slot sections of the control slots when the movable contact carrier is moved among the TEST-ON-TEST operating positions, and slide in the sloped angled sections of said control slots when the movable contact carrier is in the OFF operating position and when the movable contact carrier is moved among the OFF-TEST-OFF operating positions.

FIGS. 2, 2a and 2b show, respectively, side, top and end views, partially in section, of a fastening device for auxiliary switches for branch circuits of insertable switch components mounted in an enclosure having a movable main contact carrier as described above. More particularly, these figures show a housing 15 for accommodation of auxiliary switches 17 which are arranged in two juxtaposed rows of three auxiliary switches 17. Housing 15 is connected to side wall 3 by screws 27. A slide 16 is guided in housing 15 below auxiliary switches 17 a shown most clearly in FIG. 2b and is articulated directly with a movable main contact carrier (not shown in the drawing) by way of a connecting element 7. A directional arrow 26 indicates the direction of movement of slide 16 in housing 15. Inserts 19 are fastened by means of screws 21 on two adjacent control paths 18 on slide 16. The top faces of inserts 19 are provided with wedge-shaped control contours 20.

As can be seen from the top view in FIG. 2a, the auxiliary switches 17 of the front row are held in housing 15 by means of snap elements 23. Auxiliary switches 17 of the row adjacent side wall 3 are pushed into housing 15 through rearward openings 29 and are secured in their places by side wall 3 when the housing 15 is attached to side wall 3. As a deviation therefrom, it would also be possible to effectively fasten auxiliary switches 17 in the row adjacent side wall 3 by means of additional snap elements 23 disposed in housing 15.

For the purpose of varying the control functions, inserts 19 are preferably exchangeable. Individual inserts 19 may, for example, be fastened on control path 18 with a smooth contact surface 28 oriented upwardly, instead of the wedge-shaped control contour 20, to cooperate with plungers 22 of auxiliary switches 17. The frontal view in FIG. 2 shows such an insert, which is the third insert from the right. The exchangeability of the inserts also permits the use of any desired, differently configured control contours.

Housing 15 includes connecting chambers 24 for receiving the projection of connecting lugs 25 on auxiliary switches 17, when the auxiliary switches are inserted in housing 15. Connecting chambers 24 are freely accessible from the top so that plug-in connections can be pushed onto connecting lugs 25.

Obviously, numerous and additional modifications and variations of the present invention are possible in light of the above teachings. It is therefore to be understood that within the scope of the appended claims, the invention may be practiced otherwise than as specifically claimed.

What is claimed is:

1. In a branch circuit connection for a switch component which is insertable in an enclosure having a side wall, wherein the branch circuit connection is articulated to a main contact carrier which is movable within the enclosure for establishing main circuit connections between the switch component and bus bars of a switching panel, and the switch component remains stationary during movement of the main contact carrier among OFF-TEST-ON operating positions of the main contact carrier relative to the switch component, the improvement comprising:

a female connector strip displaceably mounted at the side wall of the enclosure;

a male connector strip for mating with said female connector strip and rigidly fastened to the insertable switch component;

actuation means coupled to the main contact carrier for lowering, raising and causing said female connector strip to dwell in a position in dependence on the OFF-TEST-ON operating position of the main contact carrier.

2. A branch circuit connection as defined in claim 1, further including pins fixed to the side wall of the enclosure and projecting inwardly of the enclosure and vertically arranged long hole slots disposed in the side wall of the enclosure, and wherein said actuation means comprises;

a carrier plate having opposite sides and mounting said female connector strip on one side and having pins projecting from the other side toward the side wall of the enclosure, said carrier plate further being provided with vertically arranged long hole slots;

a control plate coupled to the main contact carrier and mounted between said carrier plate and the side wall of the enclosure and having control slots each having a horizontal slot section and an acute-angle slot section, the pins of said carrier plate penetrating said control slots in said acute-angle slot sections and passing through said long holes of the side wall, the pins of said side wall penetrating said control slots in said horizontal slot sections and the long holes of said carrier plate, and said control plate being movable in a horizontal direction guided by said control slots and the pins of the side wall.

3. A branch circuit connection as defined in claim 2, wherein the pins of said carrier plate slide in the horizontal slot sections of said control slots when the movable contact carrier is moved among the TEST-ON-TEST operating positions, and slide in the sloped angled sections of said control slots when the movable contact carrier is in the OFF operating position and when the movable contact carrier is moved among the OFF-TEST-OFF operating positions.

4. A branch circuit connection as defined in claim 2, wherein the pins of said carrier plate have free ends and further including lock washers mounted on said free ends for holding said carrier plate and said control plate at the side wall of the enclosure.

5. A fastening device for auxiliary switches of branch circuits of a switch component inserted in an enclosure having a side wall, the auxiliary switches being controlled in dependence on operating positions of a movable main contact carrier which is movable among OFF-TEST-ON positions relative to the insertable switch component which remains stationary in the enclosure, the improvement comprising:
   a housing for stationarily accommodating the auxiliary switches and being fastened to the side wall of the enclosure; and
   a slide articulated to the movable main contact carrier and controlling the auxiliary switches.

6. A fastening device for auxiliary switches as defined in claim 5, wherein said housing is fastened to the side wall of the enclosure and further including means for guiding said slide in said housing.

7. A fastening device for auxiliary switches as defined in claim 5, wherein the auxiliary switches have plungers and said slide has a control path, and further including inserts disposed on the control path and having control contours which cooperate with the plungers of the auxiliary switches.

8. A fastening device for auxiliary switches as defined in claim 7, wherein the inserts are fastened on said slide with their control contours oriented toward the control path so that the control contours cooperate with the plungers of the auxiliary switches for varying control functions relating to the insertable switch components.

9. A fastening device for auxiliary switches as defined in claim 5, wherein said housing has rearward openings for the insertion of the auxiliary switches and further including means for securing the auxiliary switches in said housing.

10. A fastening device for auxiliary switches as defined in claim 7, wherein said housing is configured for accommodating the auxiliary switches in juxtaposed rows, and the control paths on said slide are associated with the respective row of auxiliary switches.

11. A fastening device for auxiliary switches as defined in claim 10, wherein one of the juxtaposed rows of switches faces away from the side wall of the enclosure and said housing includes snap elements for holding the auxiliary switches in said row facing away from the side wall.

12. A fastening device for auxiliary switches as defined claim 5, wherein the auxiliary switches have electrical connecting lugs and said housing includes isolated connecting chambers for receiving the connecting lugs of the auxiliary switches, said isolated connecting chambers having openings for the introduction of connecting cables for attachment to the connecting lugs.

* * * * *